(12) United States Patent
Parker et al.

(10) Patent No.: US 11,495,420 B2
(45) Date of Patent: Nov. 8, 2022

(54) APPARATUS AND METHOD FOR ACTIVATING SWITCHES

(71) Applicant: Gulfstream Aerospace Corporation, Savannah, GA (US)

(72) Inventors: David Parker, Savannah, GA (US); Ryan Frost, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/929,809

(22) Filed: May 22, 2020

(65) Prior Publication Data
US 2021/0366671 A1 Nov. 25, 2021

(51) Int. Cl.
| | |
|---|---|
| *H01H 13/18* | (2006.01) |
| *B64C 19/00* | (2006.01) |
| *B64D 43/00* | (2006.01) |
| *F16B 2/06* | (2006.01) |
| *H01H 13/20* | (2006.01) |
| *H01H 13/50* | (2006.01) |

(52) U.S. Cl.
CPC .......... *H01H 13/183* (2013.01); *B64C 19/00* (2013.01); *B64D 43/00* (2013.01); *F16B 2/065* (2013.01); *H01H 13/20* (2013.01); *H01H 13/50* (2013.01)

(58) Field of Classification Search
CPC ...... H01H 13/02; H01H 13/183; H01H 13/50; H01H 3/125; H01H 13/705; H01H 13/14; H01H 13/70; H01H 13/704; H01H 13/7065; H01H 13/7006; H01H 13/7057; H01H 13/78; H01H 13/79; H01H 13/52; H01H 13/703; H01H 13/507; B64C 19/00; B64D 43/00; F16B 2/065
See application file for complete search history.

(56) References Cited

U.S. PATENT DOCUMENTS

| | | | | |
|---|---|---|---|---|
| 4,480,163 A | * | 10/1984 | Morris | H01H 3/12 |
| | | | | 200/331 |
| 5,193,667 A | * | 3/1993 | Choi | H01H 13/70 |
| | | | | 200/331 |
| 6,580,041 B1 | | 6/2003 | Ransopher | |
| 2004/0256205 A1 | * | 12/2004 | Oshio | G04B 3/048 |
| | | | | 200/43.13 |

FOREIGN PATENT DOCUMENTS

| | | |
|---|---|---|
| EP | 2490238 A1 | 8/2012 |
| FR | 2814586 A1 | 3/2002 |

* cited by examiner

*Primary Examiner* — Ahmed M Saeed
(74) *Attorney, Agent, or Firm* — LKGlobal | Lorenz & Kopf, LLP

(57) ABSTRACT

Apparatuses and methods for activating a switch are provided. The switch is supported by one of a bracket and a panel and includes a switch body and a switch plunger that is moveably coupled to the switch body to activate and deactivate the switch. In one example, the apparatus includes a clamp body that is configured to be removably coupled to the one of the bracket and the panel and that has an opening formed therethrough. The apparatus further includes a rod portion having a first end portion that has a surface that includes a first concave surface. The rod portion is configured to be advanced through the opening. The surface interfaces with the switch plunger and moves the switch plunger to activate the switch when the clamp body is coupled to the one of the bracket and the panel and when the rod portion is advanced through the opening.

16 Claims, 7 Drawing Sheets

APPARATUS AND METHOD FOR ACTIVATING SWITCHES

TECHNICAL FIELD

The technical field relates generally to switches, and more particularly, relates to apparatuses and methods for activating and/or deactivating switches such as push switches or the like.

BACKGROUND

There are a vast number of different switches for various applications but in general, switches are commonly used to control system pathways in mechanical and/or electrical systems. For example, a push switch is a type of switch that includes, for example, a plunger that can be pressed or otherwise moved to activate and/or deactivate the switch, thereby closing or opening a system pathway(s) (e.g., electrical pathway(s), circuit(s), or the like) that is in electrical communication with the push switch. For example, movement of the plunger in one direction results in activation of the switch thereby closing the system pathway(s) to allow electrical current therethrough and movement of the plunger in another direction results in deactivation of the switch thereby opening the system pathway(s) to prevent electrical current from passing therethrough.

Switches such as push switches are useful in, for example, panel door applications where the panel door can be opened to allow access to a compartment, component, device or the like that is arranged behind the panel door. In vehicles such as aircraft, plunger-style push switches are commonly used as door switches and are arranged near and/or adjacent to the panel door opening such that when the panel door is closed, the plunger of the door switch is moved by the panel door thereby activating or deactivating the switch to close or open the system pathway(s). In these applications, the system pathway(s) controlled by door switches often communicate electrical signals to a control system or other electronic system in response to the panel door being opened (or in an open position) or closed (or in a closed position).

During testing and/or maintenance of vehicles such as an aircraft or the like, it is often the case that a panel door(s) is opened and must remain open for worker(s) to perform various tests on the aircraft while the control system requires that the door(s) be closed for other worker(s) to perform other tests concurrently on other aspects of the aircraft. In such cases, worker(s) may use their finger(s) or zip ties to hold the plunger of the door switch down, thereby communicating an electrical signal to the control system indicating that the panel door is closed when in fact the door is actually open. Unfortunately, worker(s) using their finger(s) to hold down the plunger of the door switch can result in damage to the switch and/or prevents the worker(s) from efficiently performing the other tasks that need to be accomplished during testing. Further, the use of zip ties to hold down the plunger of the door switch is unreliable as the zip ties often come undone from the plunger, thereby interrupt testing.

Accordingly, it is desirable to provide apparatuses and methods for activating a switch that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an apparatus and a method for activating a switch are provided herein. The switch is supported by one of a bracket and a panel and includes a switch body and a switch plunger that is moveably coupled to the switch body to activate and deactivate the switch.

In a first non-limiting embodiment, the apparatus includes, but is not limited to, a clamp body that is configured to be removably coupled to the one of the bracket and the panel and that has an opening formed therethrough. The apparatus further includes, but is not limited to, a rod portion having a first end portion that has a surface that includes a first concave surface. The rod portion is configured to be advanced through the opening. The surface interfaces with the switch plunger and moves the switch plunger to activate the switch when the clamp body is coupled to the one of the bracket and the panel and when the rod portion is advanced through the opening.

In another non-limiting embodiment, the method includes, but is not limited to, coupling a removably couplable clamp body to the one of the bracket and the panel. The clamp body has an opening formed therethrough. The method further includes, but is not limited to, advancing a rod portion through the opening such that a surface of the rod portion interfaces with the switch plunger to move the switch plunger to activate the switch. The surface of the rod includes a first concave surface.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses for activating a switch. The switch is supported by a bracket and includes a switch body and a switch plunger that is moveably coupled to the switch body to activate and deactivate the switch. The exemplary embodiments taught herein provide an apparatus that includes a clamp body that is configured to removably coupled to the bracket. The clamp body has an opening formed therethrough.

The apparatus further includes a rod portion that has an end portion that has a surface that includes a concave surface. The rod portion is configured to be advanced through the opening of the clamp body such that the surface of the end portion contacts or otherwise interfaces with the switch plunger to move the switch plunger to activate the switch when the clamp body is coupled to the bracket. In one example, with the clamp body coupled to the bracket, the rod portion is advanced through the opening of the clamp body and the concave surface of the rod portion contacts and moves the switch plunger to an active position to activate the switch.

In an exemplary embodiment, advantageously, by contacting and moving the switch plunger with the concave surface of the end portion of the rod portion of the apparatus, the switch is activated by moving the switch plunger to the active position without causing damage to the switch. Further, coupling the clamp body to the bracket, supporting the rod portion of the apparatus in the opening of the clamp body, and interfacing the concave surface of the rod portion with the switch plunger helps secure the apparatus in a supported position to reliably hold down the switch plunger in the active position without dislodging and/or falling off and thereby unintentionally deactivating the switch. In particular, when the apparatus is in the supported position, a portion of the switch plunger is advantageously nested against or otherwise captured by the concave surface to maintain coupling between the apparatus and the switch even against external forces such as gravity or otherwise. As such, the switch remains activated until the concave surface is manually decoupled from the switch plunger by, for example, a worker(s).

Figure 1:
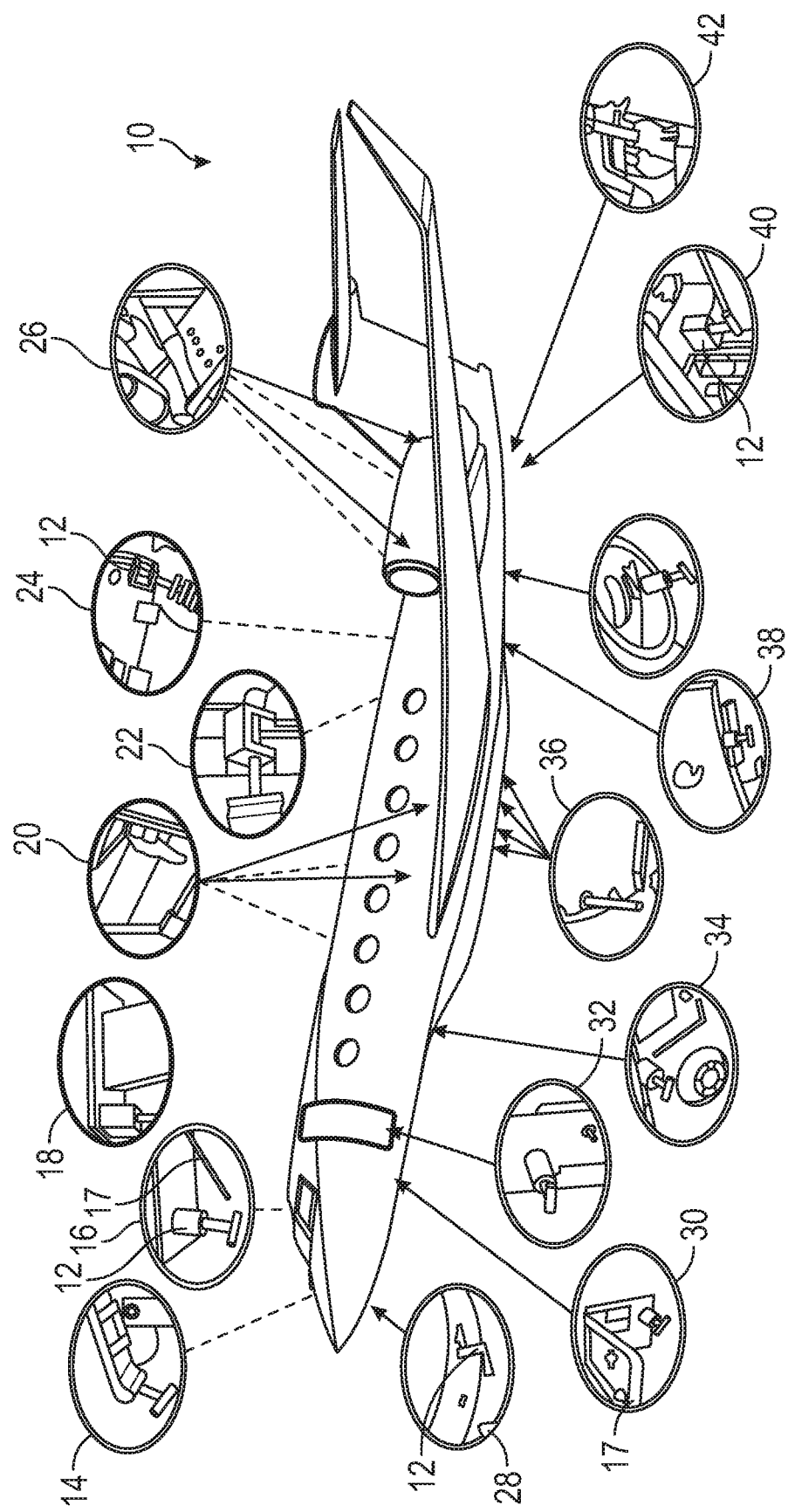
FIG. 1 illustrates a perspective view of an aircraft including a plurality of panel door areas with corresponding switches in accordance with an exemplary embodiment.

FIG. 1 illustrates a perspective view of an aircraft 10 in accordance with an exemplary embodiment. The aircraft 10 includes switches 12 that are disposed in various locations of the aircraft 10. In an exemplary embodiment, the various locations are or include service areas that each include, for example, a panel door 17 that can be opened for access to a compartment for maintenance, testing, and/or the like. As illustrated, the switches 12 are correspondingly disposed in, near, and/or adjacent to the following panel door or service locations: the landing gear service panel area 14, the direct current (DC) service door area 16, the alternating current (AC) service door area 18, the over-wing emergency door area 20, the internal baggage door area 22, the waste water service door area 24, the engine cowl area 26, the radome area 28, the forward security panel area 30, the emergency EMED panel area 32, the fuel service door area 34, the water service door area 36, the pneumatic service panel area 38, the hydraulic service panel area 40, and the boiler room access door area 42.

Figure 2:
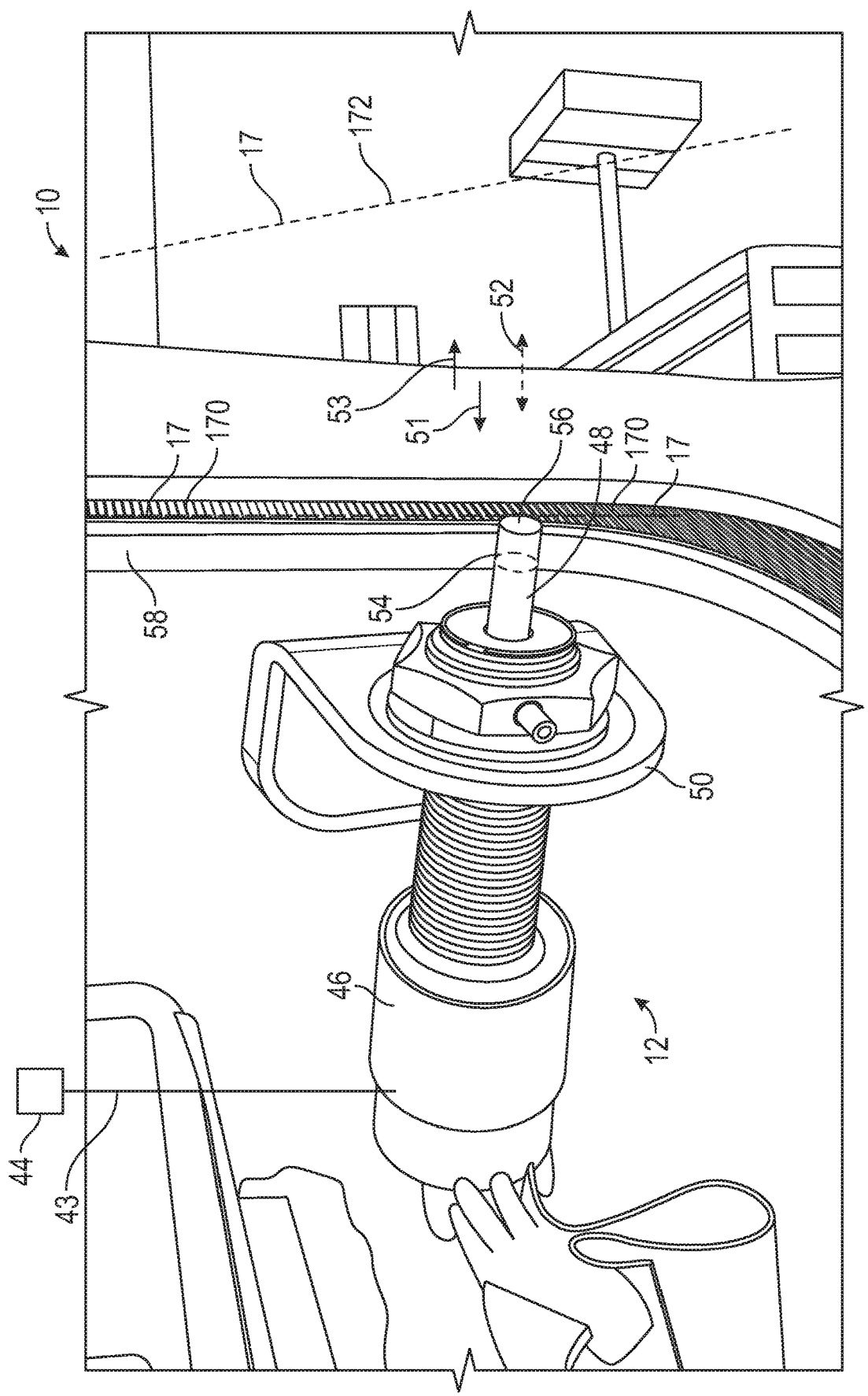
FIG. 2 illustrates a perspective view of a switch in a panel door area in accordance with an exemplary embodiment.

Referring also to FIG. 2, in an exemplary embodiment, the switch 12 is a panel door switch for a panel door 17 that is configured to electronically communicate information relating to the position (e.g., open or closed position) of the corresponding panel door 17 to a control system 44 via communication line 43. In one non-limiting example, the switch 12 is a panel door switch for the direct current (DC) service door area 16 or the like, and contacts or otherwise interfaces with the panel door 17 when the panel door 17 is in a closed position 170. The switch 12 is configured to electronically communicate to the control system 44 whether the panel door 17 is in contact with the switch 12 and therefore in the closed position 170, or if the panel door 17 has been opened, thereby breaking contact with the switch 12 to indicate that the panel door 17 is in an open position 172.

Referring to FIG. 2, in an exemplary embodiment, the switch 12 includes a switch body 46 and a switch plunger 48. The switch 12 is supported by a bracket 50 that is coupled to and/or forms a part of the aircraft 10. As illustrated, the switch 12, which is held or otherwise secured in position by the bracket 50, is disposed adjacent to an opening 58 such that the switch body 46 is recessed behind the opening 58 while the switch plunger 48 extends forward therefrom and protrudes out beyond the opening 58. The switch plunger 48 is moveably coupled (e.g., slidingly coupled) to the switch body 46 to move along the axis (indicated by double-headed arrow 52) in a rearward direction (indicated by single-headed arrow 51) to an activated position 54 or a forward direction (indicated by single-headed arrow 53) that is opposite the direction 51 to a deactivated position 56.

In an exemplary embodiment, the opening 58 is a panel door opening, and the panel door 17, which is pivotally attached to the aircraft 10, moves between the closed position 170 where the panel door 17 is disposed in the opening 58 in contact with the switch plunger 48 to the open position 172 forward and away from the opening 58 spaced apart from the switch plunger 48. In particular and as illustrated, when the panel door 17 is in the open position 172, the switch plunger 48 protrudes beyond the opening 58 and the switch 12 is in the deactivated position 56. In an exemplary embodiment, the switch 12 is configured to electronically communicate to the control system 44 that the panel door 17 is in the open position 172 when the switch 12 is in the deactivated position 56. When the panel door 17 is in the closed position 170, the panel door 17 is disposed in and substantially flush with the opening 58 such that the switch plunger 48 is recessed behind the opening 58 abutted against the back side of the panel door 17 and the switch 12 is in the activated position 54. In an exemplary embodiment, the switch 12 is configured to electronically communicate to the control system 44 that the panel door 17 is in the closed position 170 when the switch 12 is in the activated position 54.

Figure 3:
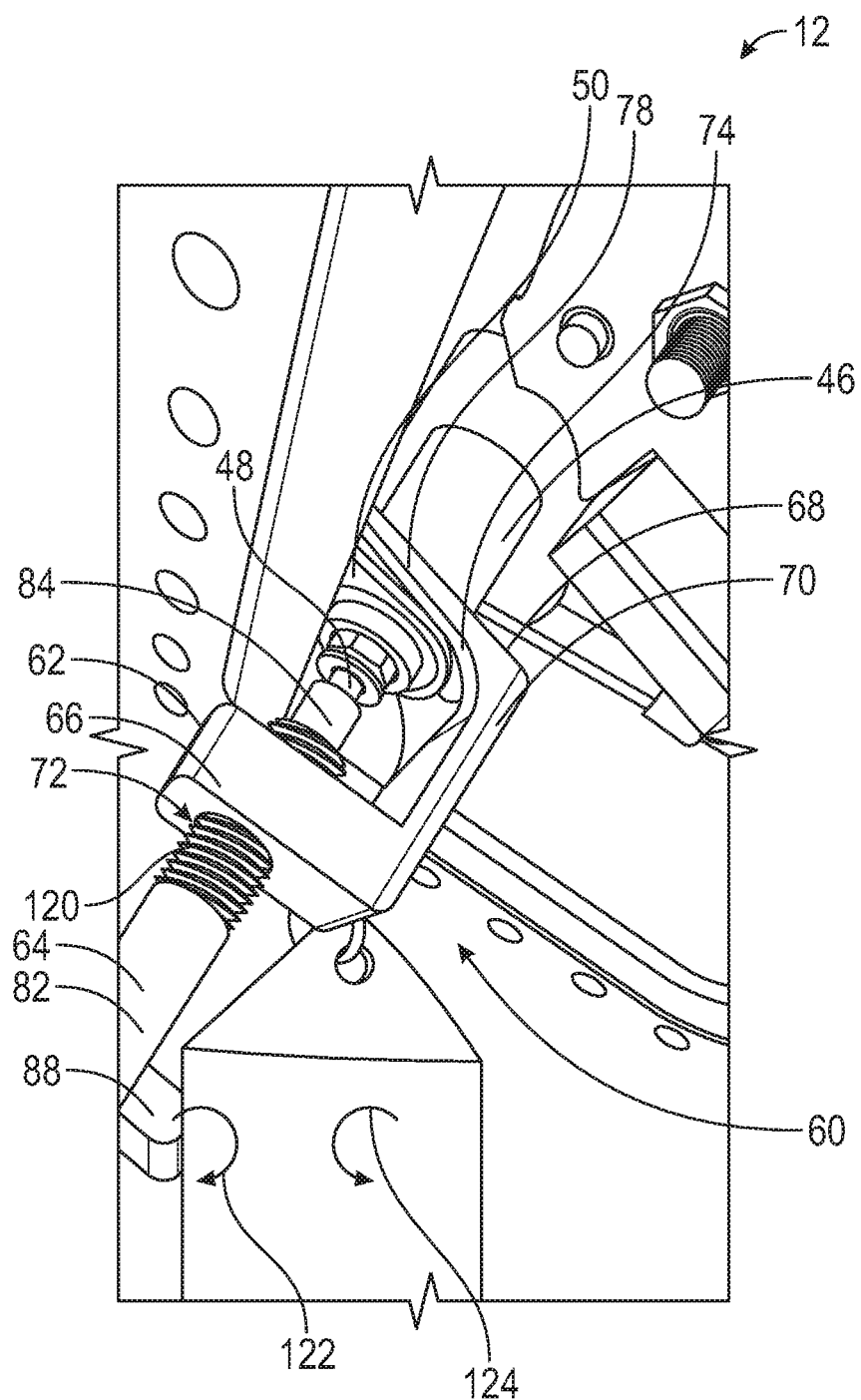
FIG. 3 illustrates a perspective view of an apparatus activating a switch in accordance with an exemplary embodiment.

FIG. 3 illustrates a perspective view of an apparatus 60 activating the switch 12 in accordance with an exemplary embodiment. The apparatus 60 includes a clamp body 62 that is configured to removably couple to the bracket 50 and a rod portion 64 that is configured to contact or otherwise interface with the switch plunger 48.

Figure 4:
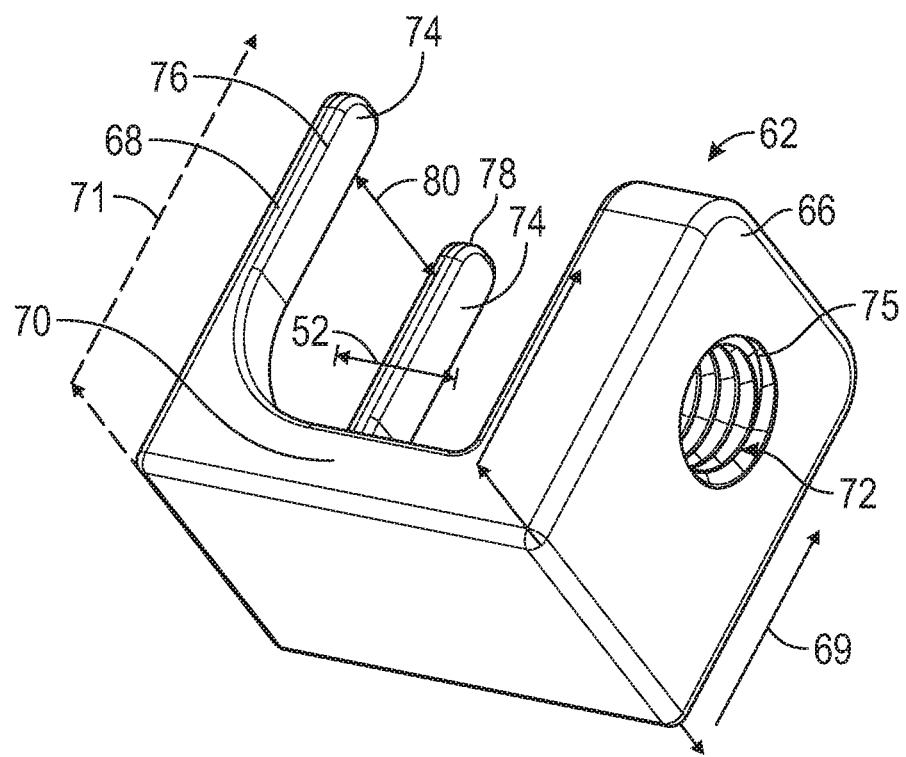
FIG. 4 illustrates a perspective view of a clamp body of an apparatus for activating a switch in accordance with an exemplary embodiment.
Figure 5A:
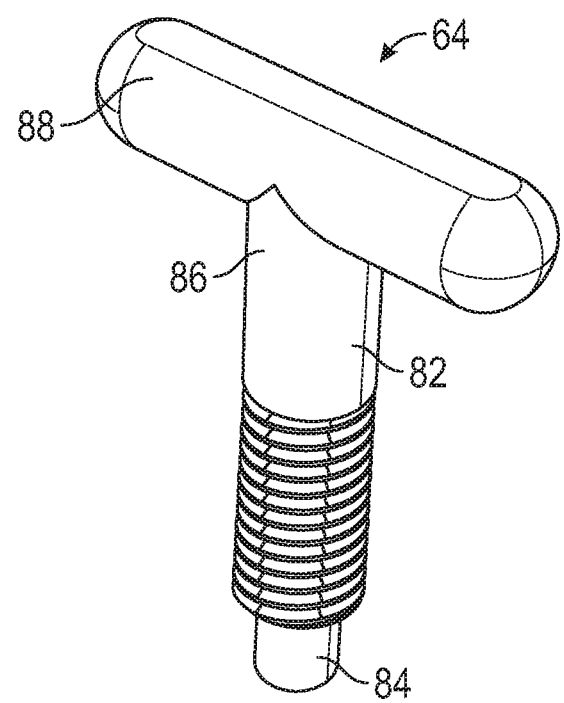
FIGS. 5A-5C illustrate a perspective view and a side view, respectively, of a rod portion of an apparatus for activating a switch in accordance with an exemplary embodiment.
Figure 5B:
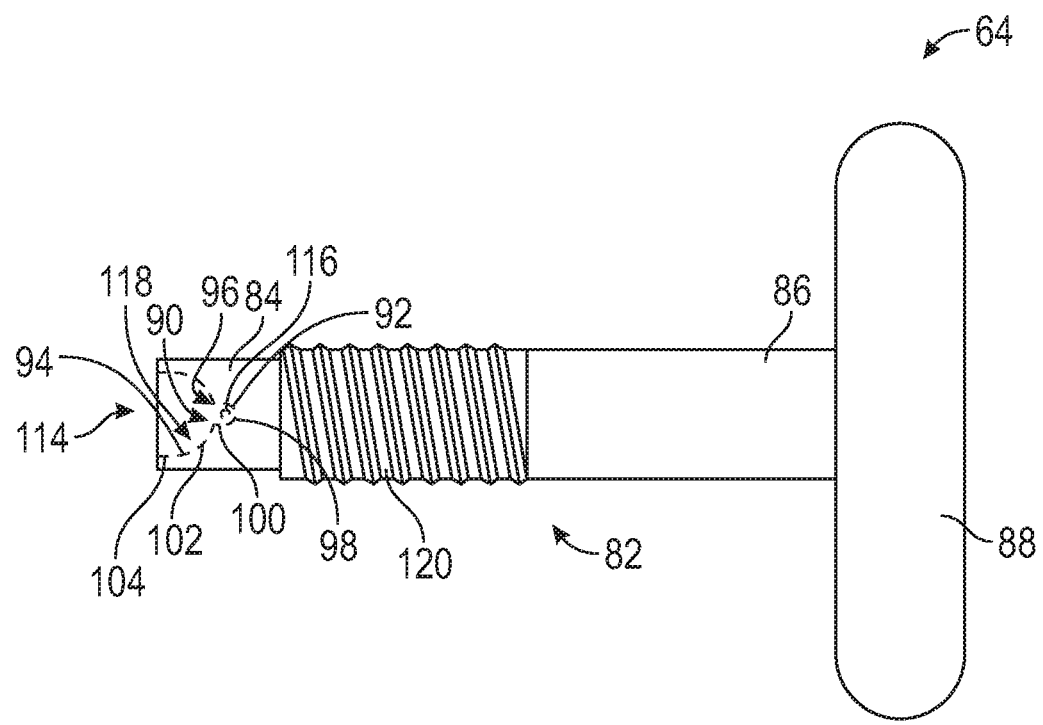
Figure 5C:
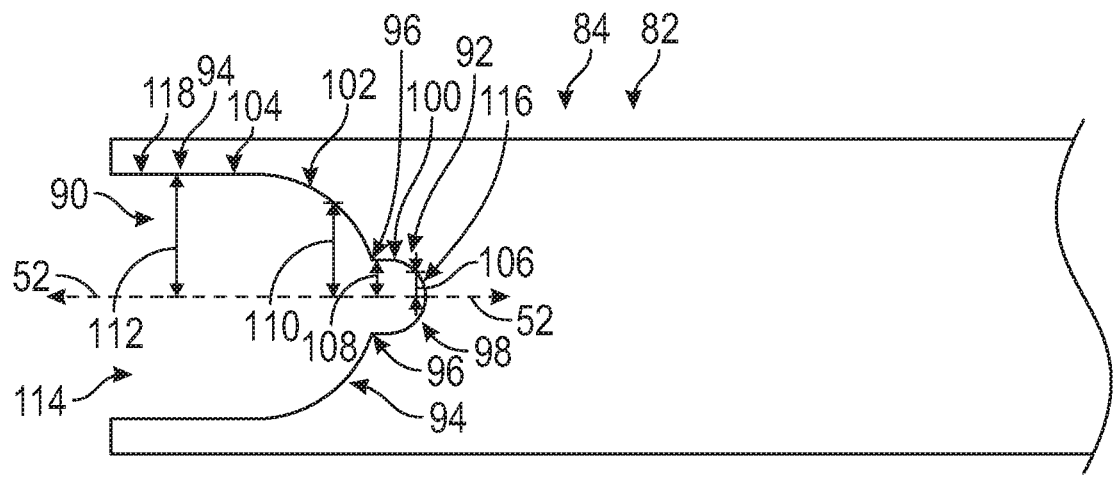
Figure 6:
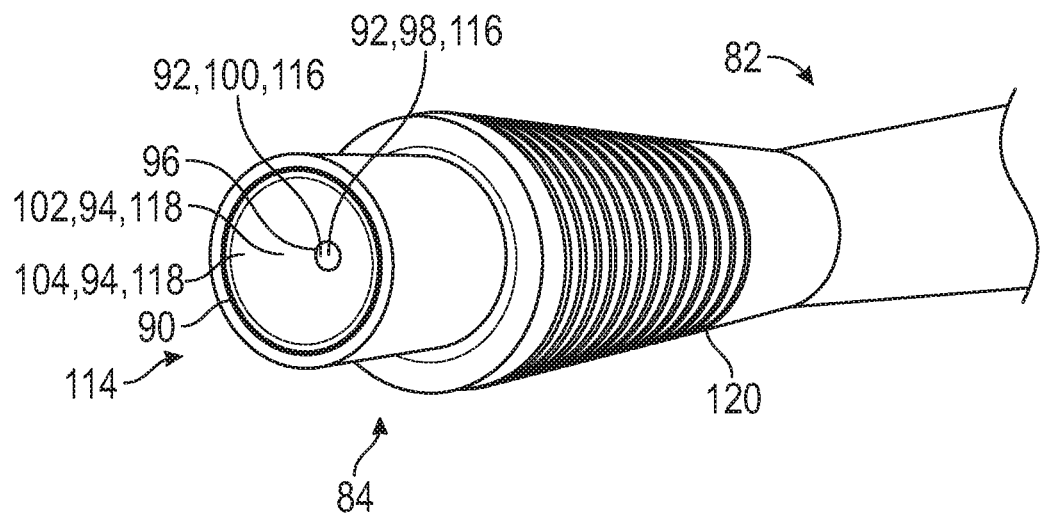
FIG. 6 illustrates a perspective view of an end portion of a rod portion of an apparatus for activating a switch in accordance with an exemplary embodiment.

Referring also to FIG. 4, a perspective view of the clamp body 62 of the apparatus 60 in accordance with an exemplary embodiment is provided. As illustrated, the clamp body 62 includes a head clamp section 66, a foot clamp section 68, and an intermediate clamp section 70 that extends therebetween from the head clamp section 66 to the foot clamp section 68. As such, the head clamp section 66 and the foot clamp section 68 are spaced apart from each other by the intermediate clamp section 70. The head clamp section 66 has an opening 72 formed therethrough. In an exemplary embodiment, the head clamp section 66 has a threaded sidewall 75 (sidewall with threads) that defines the opening 72. Referring to FIGS. 2-4, when the clamp body 62 is coupled to the bracket 50, the opening 72 is substantially coaxially aligned with the switch plunger 48 along axis 52.

Further, when the clamp body 62 is coupled to the bracket 50, the intermediate clamp section 70 extends generally in the direction 51 from the head clamp section 66 to the foot clamp section 68. In an exemplary embodiment, the clamp body 62 has a generally C-shaped frame. For example, the head clamp section 66 and the foot clamp section 68 correspondingly extend from the opposing ends of the intermediate clamp section 70 generally along spaced apart planes 69 and 71 that are substantially parallel to each other and that are transverse or substantially perpendicular to the intermediate clamp section 70 which extends along the axis 52. Various alternate embodiments of the clamp body 62 include the clamp body 62 being configured in other shapes, but including a head clamp section 66 that has an opening 72 formed therethrough and the clamp body 62 being configured to couple to the bracket 50 about the switch 12.

The foot clamp section 68 has an inner clamp surface 74 that faces generally towards the head clamp section 66 and that is configured to interface with the bracket 50. When the clamp body 62 is coupled to the bracket 50, the inner clamp surface 74 faces generally in the direction 53. In an exemplary embodiment, the foot clamp section 68 includes prongs 76 and 78 that each extend along the plane 71 and that are spaced apart to define a gap (indicated by double headed arrow 80) therebetween.

FIGS. 5A-C and 6 illustrate various views of the rod portion 64 of the apparatus 60 in accordance with exemplary embodiments. Referring to FIGS. 2-3, 5A-C and 6, the rod portion 64 includes a shaft 82 that extends from an end portion 84 to an end portion 86 that is opposite the end portion 84. As illustrated, the rod portion 64 also includes a handle portion 88 that is coupled to and extends transversely outward from the end portion 86 of the shaft 82. In an exemplary embodiment, the shaft 82 extends along the axis 52, coaxially aligned with the switch plunger 48 when the clamp body 62 is coupled to the bracket 50.

In an exemplary embodiment and as will be discussed in further detail below, the end portion 84 of the rod portion 64 has a surface 90 that is configured to interface with the switch plunger 48. When the clamp body 62 is coupled to the bracket 50, the rod portion 64 is coaxially aligned with the switch plunger 48 about the axis 52 such that the end portion 84 faces generally towards the switch plunger 48 and at least a portion of the surface 90 interfaces with at least a portion of the switch plunger 48.

As illustrated, the surface 90 includes surface sections 92 and 94. In an exemplary embodiment, when the clamp body 62 is coupled to the bracket 50, the surface section 92 extends generally in the direction 51 to the surface section 94 and the surface sections 92 and 94 intersect to define an edge 96. The surface sections 92, 94 each include a concave surface 98, 102 and a tubular surface 100, 104, respectively. When the clamp body 62 is coupled to the bracket 50, the concave surface 98 extends generally in the direction 51 to the tubular surface 100 that extends generally in the direction 51 to the concave surface 102. In an exemplary embodiment, the tubular surface 100 and the concave surface 102 intersect to define the edge 96. The concave surface 102 extends generally in the direction 51 from the edge 96 to the tubular surface 104 that extends generally in the direction 51.

In an exemplary embodiment, when the clamp body 62 is coupled to the bracket 50, the concave surfaces 98 and 102 and the tubular surfaces 100 and 104 are each disposed about the axis 52. A radial distance 106 is defined by the perpendicular distance from the axis 52 to the surface 90. As illustrated, the radial distance(s) 106 is variable due to the curvature of the concave surface 98 in relation to its distance to the axis 52. For example, the radial distance 106 increases along a corresponding length of the concave surface 98 in the direction 51 when the clamp body 62 is coupled to the bracket 50. Similarly, a perpendicular distance from the axis 52 to the tubular surface 100 defines a radial distance 108. As illustrated, the radial distance(s) 108 is substantially constant as the tubular surface 100 is substantially equidistant along all points from the axis 52. In an exemplary embodiment, the radial distance 106 is less than or equal to the radial distance 108. Likewise, a perpendicular distance from the axis 52 to the concave surface 102 defines a radial distance 110, and the perpendicular distance from the axis 52 to the tubular surface 104 defines a radial distance 112. As illustrated, the radial distance 110 is variable and the radial distance 112 is substantially constant. For example, the radial distance 110 increases along a corresponding length of the concave surface 102 in the direction 51 when the clamp body 62 is coupled to the bracket 50. In an exemplary embodiment, the radial distance 110 is greater than or equal to the radial distance 108. In an exemplary embodiment, the radial distance 112 is greater than or equal to the radial distance 110.

In an exemplary embodiment, the surface 90 defines a pocket 114 and at least a portion of the pocket 114 is configured to receive at least a portion of the switch plunger 48. The pocket 114 includes pocket sections 116 and 118 that are open to each other. The surface section 92 including the concave surface 98 and the tubular surface 100 define the pocket section 116. Likewise, the surface section 94 including the concave surface 102 and the tubular section 104 define the pocket section 118.

As discussed above, in an exemplary embodiment, when the clamp body 62 is coupled to the bracket 50, the surface 90 interfaces with the switch plunger 48. For example, the switch plunger 48, depending on its size, interfaces with either the concave surface 98 or the concave surface 102. This means that the switch plunger 48 is configured to interface with either the concave surface 98 or the concave surface 102, but not both of the concave surfaces 98 and 102. For instances, a narrower diameter switch plunger 48 may be readily received into the pocket section 116 and interface with the concave surface 98, while a wider diameter switch plunger 48 may be readily received into the pocket section 118 and interface with the concave surface 102. Accordingly, the surface 90 can be utilized to interface with various types and sizes of switch plungers 48.

In an exemplary embodiment, the shaft 82 includes a threaded region 120 disposed between the end portions 84 and 86. The threaded region 120 includes threads that engage the threads of the threaded sidewall 75 of the head clamp section 66 when the threaded region 120 is disposed in the opening 72 of the clamp body 62.

In an exemplary embodiment, the handle portion 88 extends substantially perpendicular to the shaft 82. The handle portion 88 is configured to be gripped, held, or the like by, for example, a worker.

In an exemplary embodiment, the apparatus 60 is used to activate and/or deactivate the switch 12. As illustrated, the apparatus 60 may be manually positioned about the switch 12 so that the switch body 62 couples to the bracket 50. For example, the apparatus 60 is positioned by a worker about the switch 12 with the rod portion 64 disposed in the opening 72 of the clamp body 62 such that the threaded region 120 of the shaft 82 is in contact with the threaded sidewall 75. Further, the inner clamp surface 74 is brought into contact with the bracket 50 so that the clamp body 62 interfaces with or otherwise couples to the bracket 50. In this position, the shaft 82 is coaxially aligned with the switch plunger 48 about the axis 52 and the surface 90 either interfaces with the switch plunger 48 or is brought into contact with the switch plunger 48 by rotating the handle portion 88 as discussed in further detail below. In an exemplary embodiment, when the clamp body 62 is coupled to the bracket 50, the apparatus 60 is held in a supported position. For example, interfacing the surface 90 of the rod portion 64 with the switch plunger 48 and the inner clamp surface 74 with the bracket 50 when the rod portion 64 is disposed in the opening 58 with the threaded region 120 engaging the threaded sidewall 75, allows frictional forces between the aforementioned interfaces to hold the apparatus 60 in place against outside forces such as gravity.

Next, with the clamp body 62 coupled to the bracket 50, the handle portion 88 is rotated about the axis 52 by, for example, a worker's hand in either the clockwise or counter-clockwise direction (indicated by single-headed arrows 122 and 124). In one example, the switch 12 is initially in the deactivated position 56. When a rotational force is applied to the handle portion 88 in the direction 122, the handle portion 88 rotates in the direction 122, thereby engaging the threads of the threaded region 120 with the threads of the threaded sidewall 75 to advance the rod portion 64 through the opening 58 in the direction 51. Further, because the surface 90 of the rod portion 64 is in contact with the switch plunger 48 and is being advanced in the direction 51, the switch plunger 48 is pushed or retracted in the direction 51 by the surface 90 as it moves in the direction 51. Retraction of the switch plunger 48 in the direction 51 leads to activation of the switch 12 by moving the switch 12 to the activated position 54. In an exemplary embodiment, as the switch plunger 48 is retracted towards the activated position 54, the switch plunger 48 outputs a force in the direction 53 that is countered by, for example, frictional forces between the threaded region 120 and the threaded sidewall 75 when the apparatus 60 is held in a supported position. As such, the frictional forces between the threaded region 120 and the threaded sidewall 75 prevent the switch plunger 48 from moving back towards the deactivated position 56 until the handle portion 88 is rotated in an opposite direction. As such, the switch 12 is retained in the activated position 54 as long as the apparatus 60 is held in a supported position and the handle portion 88 is not further rotated, for example in an opposite direction, to move or allow the switch plunger 48 to move to the deactivated position 56.

Figure 9:
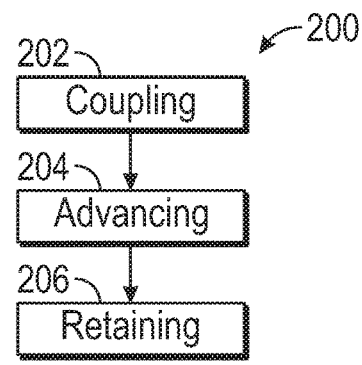
FIG. 9 illustrates a block diagram of a method for activating a switch in accordance with an exemplary embodiment.

Referring to FIG. 9, a method 200 for activating a switch in accordance with an exemplary embodiment is provided. The switch is supported by a bracket and includes a switch body and a switch plunger that is moveable coupled to the switch body to activate and deactivate the switch. The method 200 includes coupling (STEP 202) a removably couplable clamp body to the bracket. The clamp body has an opening formed therethrough. A rod portion is advanced (STEP 204) through the opening such that a surface of the rod portion interfaces with the switch plunger to move the switch plunger to activate the switch. The surface of the rod includes a first concave surface.

In an exemplary embodiment, the clamp body has a threaded sidewall that defines the opening and the rod portion includes a shaft that has a threaded region. In an exemplary embodiment, advancing (STEP 204) includes engaging the threaded sidewall with the threaded region to move the rod portion to an advanced state to move the switch to an activated state. In an exemplary embodiment, the method further comprises retaining (STEP 206) the rod portion in the advanced state to retain the switch in the activated state.

Figure 7:
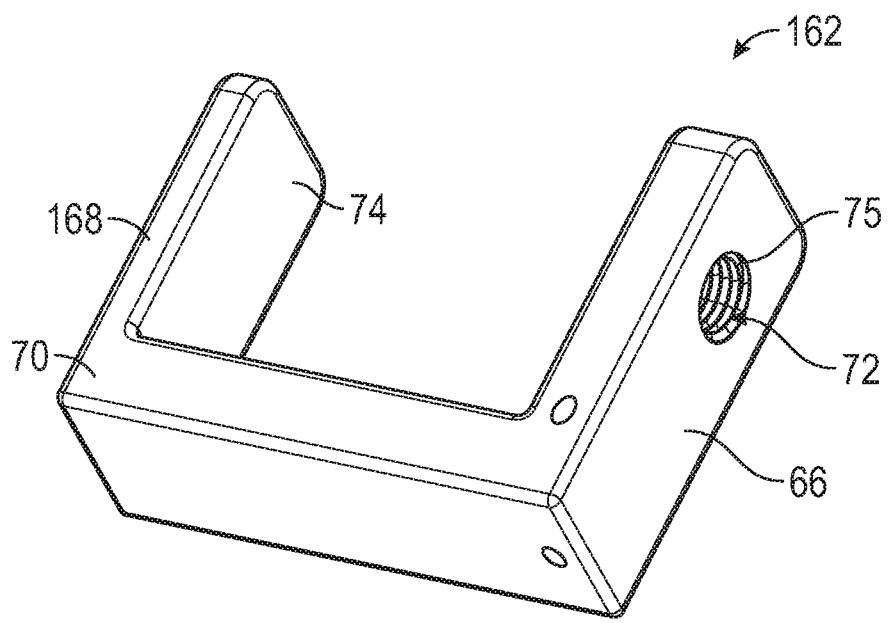
FIG. 7 illustrates a perspective view of a clamp body of an apparatus for activating a switch in accordance with an exemplary embodiment.
Figure 8:
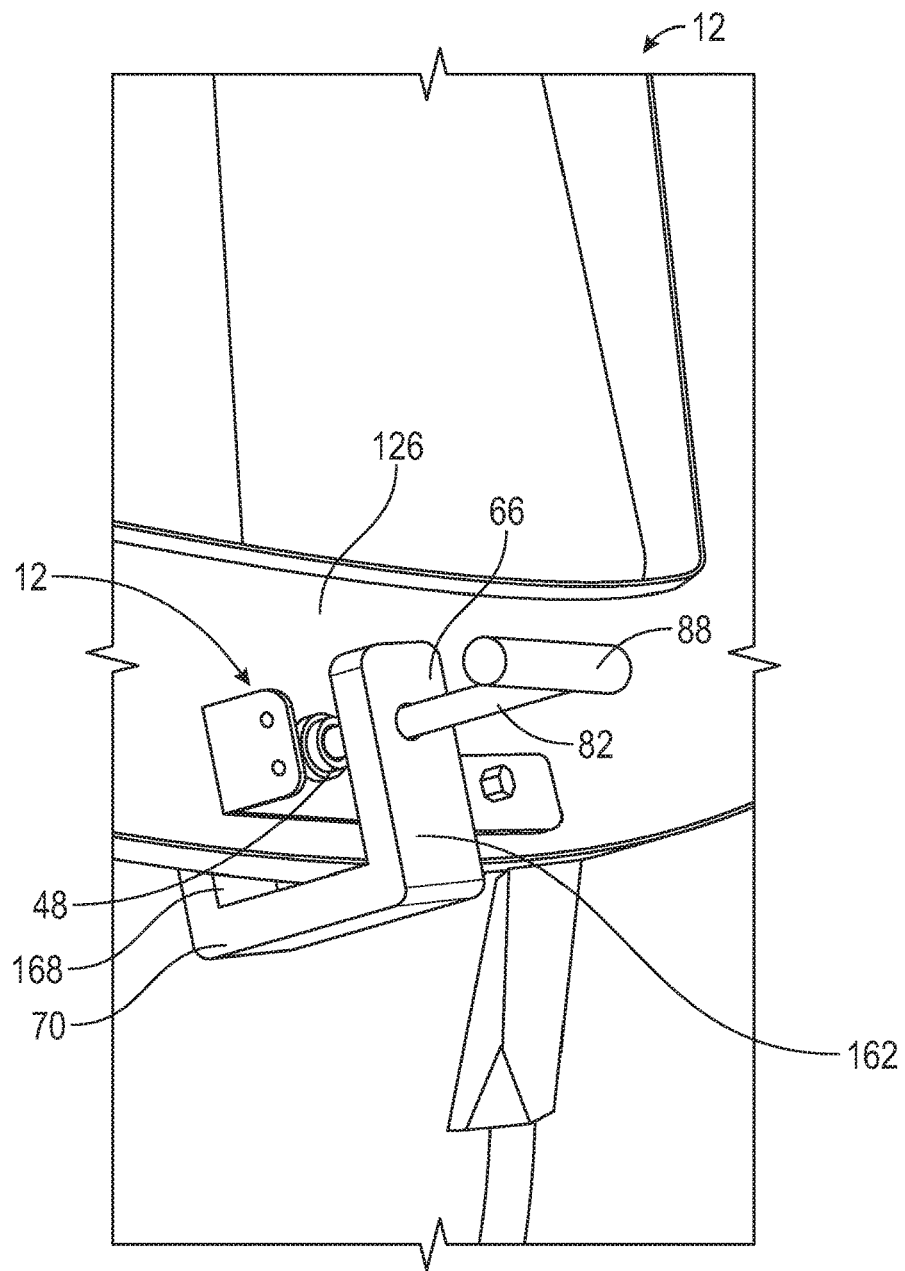
FIG. 8 illustrates a perspective view of an apparatus activating a switch in accordance with an exemplary embodiment.

Referring to FIGS. 4, 7 and 8, another embodiment is provided of an apparatus 160 that is similarly configured to the apparatus 60 depicted in FIG. 3 including the rod portion 64, but with the exception that the clamp body 162 includes a foot clamp section 168 that does not include prongs. In an exemplarily embodiment, advantageously this configuration of the clamp body 162 helps the apparatus 160 to couple to a panel, such as a bulkhead, or the like that supports the switch 12. As illustrated, the switch 12 is mounted to and/or supported by a panel 126. Accordingly, the apparatus 160 is configured to activate and/or deactivate the switch 12 when the clamp body 162 is coupled to the panel 126 as discuss above in relation to the apparatus 60.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for activating a switch that is supported by one of a bracket and a panel and that includes a switch body and a switch plunger that is moveably coupled to the switch body to activate and deactivate the switch, the apparatus comprising:
   a clamp body that is configured to be removably coupled to the one of the bracket and the panel and that has an opening formed therethrough; and
   a rod portion having a first end portion that has a surface that includes a first concave surface, wherein the rod portion is configured to be advanced through the opening, and wherein the surface interfaces with the switch plunger and moves the switch plunger to activate the switch when the clamp body is coupled to the one of the bracket and the panel and when the rod portion is advanced through the opening, wherein the rod portion is configured to be advanced through the opening in a first direction such that the first concave surface interfaces with the switch plunger to move the switch plunger in the first direction to activate the switch when the clamp body is coupled to the one of the bracket and the panel, wherein the surface defines a pocket that is configured to receive at least a portion of the switch plunger, wherein the surface includes a first surface section that includes the first concave surface, wherein the rod portion defines a longitudinal axis that is substantially parallel to the first direction, and wherein the first concave surface is disposed about the longitudinal axis, wherein the clamp body has a threaded sidewall that defines the opening, wherein the rod portion includes a shaft that extends along the longitudinal axis and that has the first end portion, a second end portion opposite the first end portion, and a threaded region disposed between the first and second end portions, and wherein the threaded region is configured to engage the threaded sidewall to advance the rod portion through the opening.

2. The apparatus of claim 1, wherein the rod portion includes a handle portion that extends substantially perpendicular to the shaft and that is coupled to the second end portion, wherein when a rotational force is applied to the handle portion and the threaded region is in contact with the threaded sidewall, the handle portion rotates the shaft about the longitudinal axis and the threaded region engages the threaded sidewall to advance the rod portion through the opening.

3. The apparatus of claim 1, wherein the surface includes a second surface section that includes a second concave surface that is disposed about the longitudinal axis, and wherein the first surface section and the second surface section intersect to define an edge.

4. The apparatus of claim 3, wherein the first surface section extends generally in the first direction to the second surface section.

5. The apparatus of claim 4, wherein the pocket includes a first pocket section and a second pocket section, wherein the first surface section defines the first pocket section and the second surface section defines the second pocket section, and wherein the first pocket section and the second pocket section are open to each other.

6. The apparatus of claim 5, wherein the first surface section further includes a first tubular surface that is disposed about the longitudinal axis, and wherein the first tubular surface extends in the first direction from the first concave surface to the second concave surface, and wherein the first tubular surface and the second concave surface intersect to define the edge.

7. The apparatus of claim 6, wherein the second surface section further includes a second tubular surface that is disposed about the longitudinal axis, and wherein the second tubular surface extends in the first direction from the second concave surface.

8. The apparatus of claim 7, wherein the first concave surface and the first tubular surface define the first pocket section, and wherein the second concave surface and the second tubular surface define the second pocket section.

9. The apparatus of claim 8, wherein displacement of the first concave surface from the longitudinal axis is defined by a first radial distance, and wherein displacement of the first tubular surface from the longitudinal axis is defined by a second radial distance, and wherein the first radial distance is at least one of less than and equal to the second radial distance.

10. The apparatus of claim 9, wherein displacement of the second concave surface from the longitudinal axis is defined by a third radial distance, and wherein the third radial distance is at least one of greater than and equal to the second radial distance.

11. The apparatus of claim 10, wherein the first radial distance and the third radial distance are variable and increase along corresponding lengths of the longitudinal axis in the first direction, and wherein the second radial distance is substantially constant along a corresponding length of the longitudinal axis in the first direction.

12. The apparatus of claim 1, wherein the clamp body includes a head clamp section that has the opening formed therethrough, a foot clamp section, and an intermediate clamp section that extends generally in the first direction from the head clamp section to the foot clamp section.

13. The apparatus of claim 12, wherein the foot clamp section has an inner clamp surface that faces opposite the first direction and that is configured to interface with the one of the bracket and the panel.

14. The apparatus of claim 13, wherein the foot clamp section includes a first prong and a second prong that extend along a plane that is substantially perpendicular to the longitudinal axis, and wherein the first prong and the second prong are spaced apart to define a gap therebetween.

15. A method for activating a switch that is supported by one of a bracket and a panel and that includes a switch body and a switch plunger that is moveably coupled to the switch body to activate and deactivate the switch, the method comprising the steps of:
   providing an apparatus comprising:
      a clamp body that is configured to be removably coupled to the one of the bracket and the panel and that has an opening formed therethrough; and
      a rod portion having a first end portion that has a surface that includes a first concave surface, wherein the rod portion is configured to be advanced through the opening, and wherein the surface interfaces with the switch plunger and moves the switch plunger to activate the switch when the clamp body is coupled to the one of the bracket and the panel and when the rod portion is advanced through the opening, wherein the rod portion is configured to be advanced through the opening in a first direction such that the first concave surface interfaces with the switch plunger to move the switch plunger in the first direction to activate the switch when the clamp body is coupled to the one of the bracket and the panel, wherein the surface defines a pocket that is configured to receive at least a portion of the switch plunger, wherein the surface includes a first surface section that includes the first concave surface, wherein the rod portion defines a longitudinal axis that is substantially parallel to the first direction, and wherein the first concave surface is disposed about the longitudinal axis, wherein the clamp body has a threaded sidewall that defines the opening, wherein the rod portion includes a shaft that extends along the longitudinal axis and that has the first end portion, a second end portion opposite the first end portion, and a threaded region disposed between the first and second end portions, and wherein the threaded region is configured to engage the threaded sidewall to advance the rod portion through the opening
   coupling the clamp body to the one of the bracket and the panel; and
   advancing the rod portion through the opening such that the surface of the rod portion interfaces with the switch plunger to move the switch plunger to activate the switch.

16. The method of claim 15, wherein the step of advancing the rod portion includes engaging the threaded sidewall with the threaded region to move the rod portion to an advanced state to move the switch to an activated state, and wherein the method further comprises the step of retaining the rod portion in the advanced state to retain the switch in the activated state.

* * * * *